Dec. 16, 1958　　W. B. WHITNEY　　2,864,857
PROCESS FOR SULFONATING OILS WITH CHLOROSULFONIC ACID
Filed Oct. 28, 1955
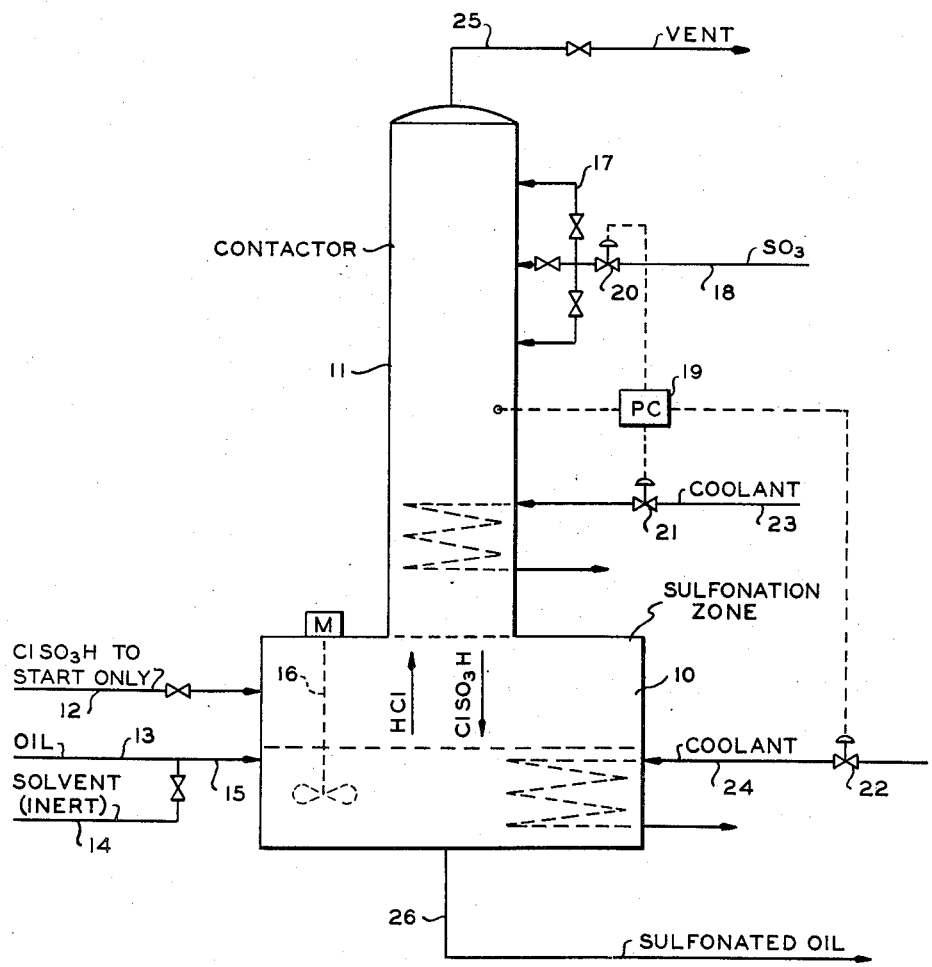
INVENTOR.
W. B. WHITNEY
BY
Hudson and Young
ATTORNEYS

United States Patent Office 2,864,857
Patented Dec. 16, 1958

2,864,857

PROCESS FOR SULFONATING OILS WITH CHLOROSULFONIC ACID

William B. Whitney, Bartlesville, Okla., assignor to Phillips Petroleum Company, a corporation of Delaware Application October 28, 1955, Serial No. 543,554

1 Claim. (Cl. 260—504)

This invention relates to an improved process and apparatus for sulfonating organic compounds. In one of its aspects this invention relates to an improved process for the sulfonation of hydrocarbon oils. In another of its aspects it relates to an improved apparatus for conducting the sulfonation process.

The term sulfonation designates any procedure by which the sulfonic group, —SO₂OH, or the corresponding salt or sulfonyl halide is attached to a carbon atom. The sulfonation of organic compounds, and especially petroleum hydrocarbon oils, has been carried out with a wide variety of sulfonating agents. Concentrated sulfuric acids and oleums of various strengths are the most common reagents for direct sulfonation. Other reagents finding extensive use include sulfur trioxide itself, various addition compounds of sulfur trioxide with organic compounds such as dioxane or pyridine, and chlorosulfonic acid. Sulfuric acid and oleum are the simplest sulfonating agents to use, but large amounts of unused and unreacted acid remain after sulfonation. The excess acid remaining after sulfonation presents a disposal problem in addition to being wasteful. Sulfur trioxide is the least expensive per mole of sulfonic acid radical introduced; however, SO₃ is very reactive and causes excessive oxidation and charring during sulfonation. Chlorosulfonic acid is a very convenient sulfonating agent but is expensive to use and, in addition, the disposal of the HCl generated during sulfonation presents a problem.

One object of the present invention is to provide a process for sulfonating organic compounds.

Another object of this invention is to provide a process for sulfonating hydrocarbon oils useful as intermediates for lubricating oil additives.

A further object of this invention is to sulfonate petroleum hydrocarbon oils wherein the liberated gaseous HCl is recovered as chlorosulfonic acid for further use as a sulfonating agent.

A still further object is to provide a process whereby the problem of HCl disposal is substantially eliminated.

A yet further object is to provide a system wherein the equipment requirements are fulfilled in a novel and advantageous manner.

Numerous other objects of the present invention will be apparent to those skilled in the art from a consideration of the specification taken in conjunction with the accompanying drawing.

Broadly, my invention comprises a process an apparatus for sulfonating an organic compound, especially hydrocarbon oils, wherein the sulfonation agent is chlorosulfonic acid which initiates the sulfonation reaction of the hydrocarbon oil. Once the reaction commences, gaseous HCl is produced which is caused to contact SO₃ at a suitable temperature and pressure, to form chlorosulfonic acid which is then returned to the reactor as the source of the sulfonating agent. It becomes readily apparent that in this manner the sulfonation reaction perpetuates itself.

More specifically, my invention is concerned with sulfonating a petroleum hydrocarbon oil, such as a de-asphalted and solvent-refined petroleum fraction having a viscosity in the range between about 120 to 700 SUS at 210° F., preferably about 175–600 SUS at 210° F., with chlorosulfonic acid which initiates the sulfonation reaction and thereby liberates gaseous HCl as shown in the equation below:

$$RH + ClSO_3H \rightarrow RSO_3H + HCl\uparrow$$

wherein R represents alkyl, cycloalkyl or aryl radicals. A particularly useful feed stock is one which possesses a viscosity in the range of 200–230 SUS at 210° F. The sulfonation reaction is usually carried out at a temperature within the range of 30° to 200° F., with a preferred operating range being between 50° to 130° F.; the pressure generally employed is atmospheric pressure or slightly above, although pressures greater or less than atmospheric can be employed, if desired. The liberated gaseous HCl in the sulfonation zone, is contacted countercurrently with liquid SO₃ in a suitable contactor column, thereby forming chlorosulfonic acid which now represents the source of the sulfonation agent during the onstream procedure. The amount of SO₃ introduced in the contactor is regulated by pressure responsive means in the path of flow of the HCl liberated from the sulfonation zone. The increase of gaseous HCl in the contactor increases the pressure therein, causing the pressure responsive means to increase the rate of flow of liquid SO₃ into the contactor to react with the gaseous HCl. The pressure in the contactor column should be of a magnitude to insure liquefaction of the SO₃ and the temperature should be below about 200° F., and is preferably maintained below about 150° F. The sulfonation reaction is exothermic, and this heat of reaction must be removed in order to maintain the desired sulfonation temperature. Since one mol of HCl is liberated for each mol of ClSO₃H reacting with the oil, the pressure of gaseous HCl in the contacting column is a measure of the sulfonation reaction rate. Therefore, this pressure (HCl) can be utilized to actuate the pressure responsive means which in turn control the amount of coolant flowing through cooling coils in the reactor and consequently, temperature control of the sulfonation reaction mixture is maintained as desired.

The advantages of the present process are that in the use of chlorosulfonic acid there is little or no waste of the sulfonating agent. Moreover, the liberated HCl generated during the sulfonation reaction is subsequently recovered in the form of additional chlorosulfonic acid, thus removing the problem of HCl disposal. In addition, the process of the present invention functions at a smooth, uniform sulfonation rate, and uses SO₃ as the sulfonating agent in a form which does not cause violent reaction, oxidation, charring, or excessive darkening. When sulfonating a light mineral oil, such as a SAE–10 stock, with sulfuric acid or oleum, the spent acid is found in the reaction effluent which separates as an acid sludge or acid phase from the oil phase on standing. However, sulfonating a petroleum hydrocarbon oil having a viscosity in the range of 120–700 SUS at 210° F. with H₂SO₄ or oleum yields an emulsified effluent comprising sulfonated oil and acid. The presence of such emulsion is undesirable for several reasons. First, it is necessary to break the emulsion if the recovery of the sulfonated oils is desired. Secondly, if the emulsified effluent is neutralized directly with a base to thus form metal salts of organic sulfonic acid, additional base is necessary to neutralize the sulfonating agent, i. e., H₂SO₄ or oleum, also present in the emulsion. Such procedure presents the additional problem of removing the metal sulfates, etc., present after the neutralization step. Therefore, it is readily apparent that an emulsified effluent resulting from the H₂SO₄ sulfonation of a petroleum stock having a viscosity in the range of 120–700 SUS at 210° F. requires additional steps and/or equipment to resolve the emulsion. The sulfonating agent, i. e., ClSO₃H, of my novel process and apparatus obviate the above difficulties as substantially little or no ClSO₃H is carried out with the reaction effluent.

Better understanding of the process and apparatus will be obtained upon reference to the accompanying diagram which shows a specific embodiment of my invention and which is not to be construed as duly limited thereof.

The figure portrays diagrammatically one arrangement of equipment which may very advantageously be employed in carrying out the present invention.

Referring now to the drawing, the apparatus utilized in the process of my invention comprises a sulfonation reaction vessel 10 and the HCl recovery contactor column 11. To start the operation of the sulfonator, a small initial charge of chlorosulfonic acid is introduced into the reaction zone 10 through line 12, while the oil to be sulfonated is passed to the reactor through lines 13 and 15 together with an inert solvent, if desired, such as chloroform, butane, hexane, and the like, introduced into line 13 by line 14. The sulfonation reaction in the reaction zone 10, which is provided with agitator 16, produces HCl which rises into the contactor column 11, countercurrent to liquid sulfur trioxide, which is introduced through line 18 and header 17 into said contactor column. The contactor column can be filled with inert packing material, if desired. By contacting the HCl and SO₃ intimately at substantially room temperature, chlorosulfonic acid is formed and returned to the sulfonation zone. The formation of chlorosulfonic acid proceeds spontaneously with evolution of heat, but the temperature should be prevented from rising about 200° F., and preferably is maintained below about 150° F. under these conditions the reaction will go substantially to completion. The amount of HCl and SO₃ in the contactor column is preferably equimolar; however, an excess of either HCl or SO₃ may be maintained depending upon the sulfonating agent desired. For example, by maintaining an excess of HCl in the contactor column pure chlorosulfonic acid is returned to the sulfonation zone because HCl is sparingly soluble in chlorosulfonic acid, whereas SO₃ is readily soluble, and thus if an excess of SO₃ is present in contactor 11, a mixture of chlorosulfonic acid and SO₃ is returned to the sulfonation zone. The amount of SO₃ present in contactor 11 can be controlled by any suitable means, such as, a pressure sensitive device as shown at 19. An increase of gaseous HCl liberated in the sulfonation zone will cause a build up or increase in pressure in the contactor column. The increased HCl pressure in the contactor column will cause the pressure responsive device 19 to actuate control valve 20 thereby causing SO₃ to flow through conduit 18, past control valve 20, and into the contactor column. The SO₃ reacts with the gaseous HCl thereby decreasing the pressure in the said column. In addition, the pressure sensitive device 19 also actuates control valve 21 permitting the flow of a coolant through conduit 23, past control valve 21, and into the coil located within the contactor column thus maintaining the desired predetermined temperature. Moreover, the pressure responsive means can function in a dual capacity. Concomitant with the liberation of HCl from the exothermic sulfonation reaction is the generation of heat therein. This increased HCl pressure will cause the pressure sensitive device 19 to actuate control valve 22 permitting the flow of a refrigerant past control valve 22, through line 24, and into the coils within the sulfonation zone, thus maintaining the predetermined temperature range within the sulfonation zone. Vent 25 is provided to remove undesirable nitrogen, air, low boiling gases, and the like, which may build up within the system. A small quantity of makeup HCl may be periodically introduced into the system to replace the cumulative losses of HCl resulting from the normal course of the operation. The sulfonated oil is removed from the reaction zone 10 by line 26 for further processing.

The process and apparatus of the present invention can be used in connection with various processes of sulfonation and recovery of sulfonic acids. The process of the present invention is especially applicable to the sulfonation of highly refined, high molecular weight petroleum fractions, such as de-asphalted and solvent-refined petroleum fractions having a viscosity range between about 120 and 700 SUS and 210° F., in the sulfonation of which there is no separation of acid sludge.

*Example*

A propane-fractionated, solvent-extracted, and dewaxed, Mid-Continent oil of about 205 SUS at 210° F., having a viscosity index of about 96 is fed to the sulfonator at the rate of 100 pounds/hour. The sulfonator has a capacity of 100 pounds of oil plus the required sulfonic acid. A small quantity of chlorosulfonic acid, about 18 pounds, initiates the sulfonation reaction which is maintained at approximately 100° F. under substantially one atmosphere of pressure. Liberated gaseous HCl is caused to react with liquid "Sulfan" (stabilized SO₃) in the contactor column at the rate of about 2.46 pounds of HCl/5.48 pounds of "Sulfan." The temperature of the contactor column is maintained at approximately 85° F. under about one atmosphere pressure. The sulfonated oil can be further processed to produce metal petroleum sulfonates which are useful as lubricating oil additives. For example, the sulfonated oil effluent is neutralized by adding an excess of aqueous calcium hydroxide slurry, heating to dehydrate the mixture and further heating to about 400° F. The oil is subsequently diluted with one to two volumes of pentane, centrifuged to remove inorganic salts, and the solvent is evaporated. The ash content of the product amounts to 3.68 weight percent.

It is to be understood that the invention is not limited to the specific embodiment which has been offered merely as an illustration.

Reasonable variations and modifications can be made or carried out in the light of the above disclosure without departing from the spirit or scope of said disclosure.

I claim:

In a process for sulfonating a hydrocarbon oil which comprises contacting said oil with chlorosulfonic acid in a first zone under sulfonating conditions thereby producing a hydrocarbon sulfonic acid and liberating HCl, contacting said liberated HCl with a regulated amount of SO₃ in a second zone to regenerate chlorosulfonic acid and returning the said regenerated chlorosulfonic acid as the sulfonating agent to the first zone, the improvement comprising maintaining said second zone in open vapor communication with said first zone and admitting said regulated amount of SO₃ into said second zone in an amount effective to maintain a pressure equivalent to the pressure resulting from contacting substantially equimolar amounts of HCl and SO₃ in said second zone.

References Cited in the file of this patent

UNITED STATES PATENTS

| | | |
|---|---|---|
| 2,149,662 | Brandt | Mar. 7, 1939 |
| 2,257,533 | Reich | Sept. 30, 1941 |
| 2,585,638 | Drew | Feb. 12, 1952 |
| 2,717,202 | Bailey | Sept. 6, 1955 |

OTHER REFERENCES

Parkes: Mellor's Modern Inorganic Chemistry, p. 483 (1951).

Gilbert et al.: Industrial and Engineering Chemistry, vol. 45, No. 9, p. 2071 (1953).